United States Patent
Lin

(10) Patent No.: US 7,619,885 B2
(45) Date of Patent: Nov. 17, 2009

(54) CARD FIXING STRUCTURE

(75) Inventor: Yen-Cheng Lin, Taipei (TW)

(73) Assignee: Inventec Corporation, Taipei (TW)

( * ) Notice: Subject to any disclaimer, the term of this patent is extended or adjusted under 35 U.S.C. 154(b) by 2 days.

(21) Appl. No.: 12/121,563

(22) Filed: May 15, 2008

(65) Prior Publication Data

US 2009/0231802 A1 Sep. 17, 2009

(30) Foreign Application Priority Data

Mar. 14, 2008 (TW) .............................. 97204454 U

(51) Int. Cl.
*H05K 7/20* (2006.01)
*H01L 23/36* (2006.01)
(52) U.S. Cl. ...................... 361/690; 361/692; 361/695; 165/80.3; 165/122
(58) Field of Classification Search .... 361/679–679.49, 361/690–697, 717–722, 752, 756, 796, 797, 361/799, 801–803, 818, 831; 165/80.3, 104.33, 165/104.34, 121–126, 185; 174/16.3, 252, 174/50, 52.1; 454/184; 312/223.2, 223.3
See application file for complete search history.

(56) References Cited

U.S. PATENT DOCUMENTS

| | | | | |
|---|---|---|---|---|
| 5,544,006 A * | 8/1996 | Radloff et al. | ......... | 361/679.32 |
| 6,018,458 A * | 1/2000 | Delia et al. | .................. | 361/690 |
| 6,377,470 B1 * | 4/2002 | Hayward et al. | ............ | 361/796 |
| 6,381,147 B1 * | 4/2002 | Hayward et al. | ............ | 361/756 |
| 6,477,044 B2 * | 11/2002 | Foley et al. | .................. | 361/695 |
| 6,912,131 B2 * | 6/2005 | Kabat | ......................... | 361/720 |
| 6,934,161 B2 * | 8/2005 | Kim et al. | .................... | 361/752 |
| 6,970,363 B2 * | 11/2005 | Bassett et al. | ............... | 361/801 |
| 7,167,363 B1 * | 1/2007 | Cushman et al. | ............ | 361/694 |
| 7,342,807 B2 * | 3/2008 | Mueller et al. | .............. | 361/796 |
| 7,355,850 B2 * | 4/2008 | Baldwin, Jr. | ................ | 361/695 |
| 2008/0068789 A1 * | 3/2008 | Pav et al. | ..................... | 361/687 |

* cited by examiner

*Primary Examiner*—Michael V Datskovskiy
(74) *Attorney, Agent, or Firm*—Workman Nydegger

(57) ABSTRACT

A card fixing structure includes a card holder for disposing at least one card. The card holder has an air deflector clamped on its one side. The air deflector catches the card to securely fix the card in the card holder, thereby reducing the number of fixing members and the manufacturing cost. Also, the card, the air deflector, and the card holder are easy to be assembled or disassembled.

10 Claims, 4 Drawing Sheets

CARD FIXING STRUCTURE

CROSS-REFERENCE TO RELATED APPLICATIONS

This non-provisional application claims priority under 35 U.S.C. § 119(a) on Patent Application No. 097204454 filed in Taiwan, R.O.C. on Mar. 14, 2008 the entire contents of which are hereby incorporated by reference.

BACKGROUND OF THE INVENTION

1. Field of Invention

The present invention relates to a casing, in particular, to a card fixing structure which is easily to be assembled or disassembled and has a lower manufacturing cost.

2. Related Art

Servers are a kind of computers having quicker operation speed and superior functions. A server has a plurality of cards therein for providing operation, audio-visual, and other relevant electronic functions. The cards rely on the chips disposed thereon to offer corresponding performances. However, the chips when operating may generate greater heat, which will damage the chips. In order to prevent overheating of the chips, the temperature needs to be lowered properly.

A conventional heat dispersal method disposes a plurality of air deflectors in the server, for guiding the cooled air from a fan to the chip, thereby cooling the chip to avoid overheating the chip.

The air deflector structure only provides an air guide function, and the air deflector is not in physical contact with the card. Therefore, the card needs a large number of fixing members, such as screws, flat springs, or fixing strap, so as to be fixed in the server.

Additionally, the use of a large number of fixing members means a large quantity of manpower consumption, resulting in a higher manufacturing cost, which goes against the purpose of reducing the production cost. Further, when the card needs repair or replacement, the fixing members must be first disassembled for the convenience of replacing or expanding the card, and after the repair or replacement, the disassembled fixing members must be assembled one by one, which is inconvenient in use.

SUMMARY OF THE INVENTION

The conventional air deflector merely has an airflow guide effect and cannot provide any fixing functions. Therefore, when a card needs to be installed in a server, a large number of fixing members are used, which results in a higher manufacturing cost, and increases the difficulty in installation. Accordingly, the present invention is directed to a card fixing structure which is easy to be assembled or disassembled and has a lower manufacturing cost.

The card fixing structure of the present invention includes a card holder and an air deflector. The card holder is used for disposing at least one card and has an air outlet at its one end. The air deflector is clamped on one side of the card holder and catches the card. The card holder has a guide portion at its one end and adjacent to the air outlet.

According to the card fixing structure of the present invention, the air deflector catches the card to securely fix the card in the card holder, thereby reducing the number of fixing members such as screws for fixing the card. Further, the catch relationship enables an easier repair and expansion of the card. As described above, the catch relationship can simplify the use of fixing members, reduce the manufacturing cost, and also enables an easier assembly or disassembly of the card.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
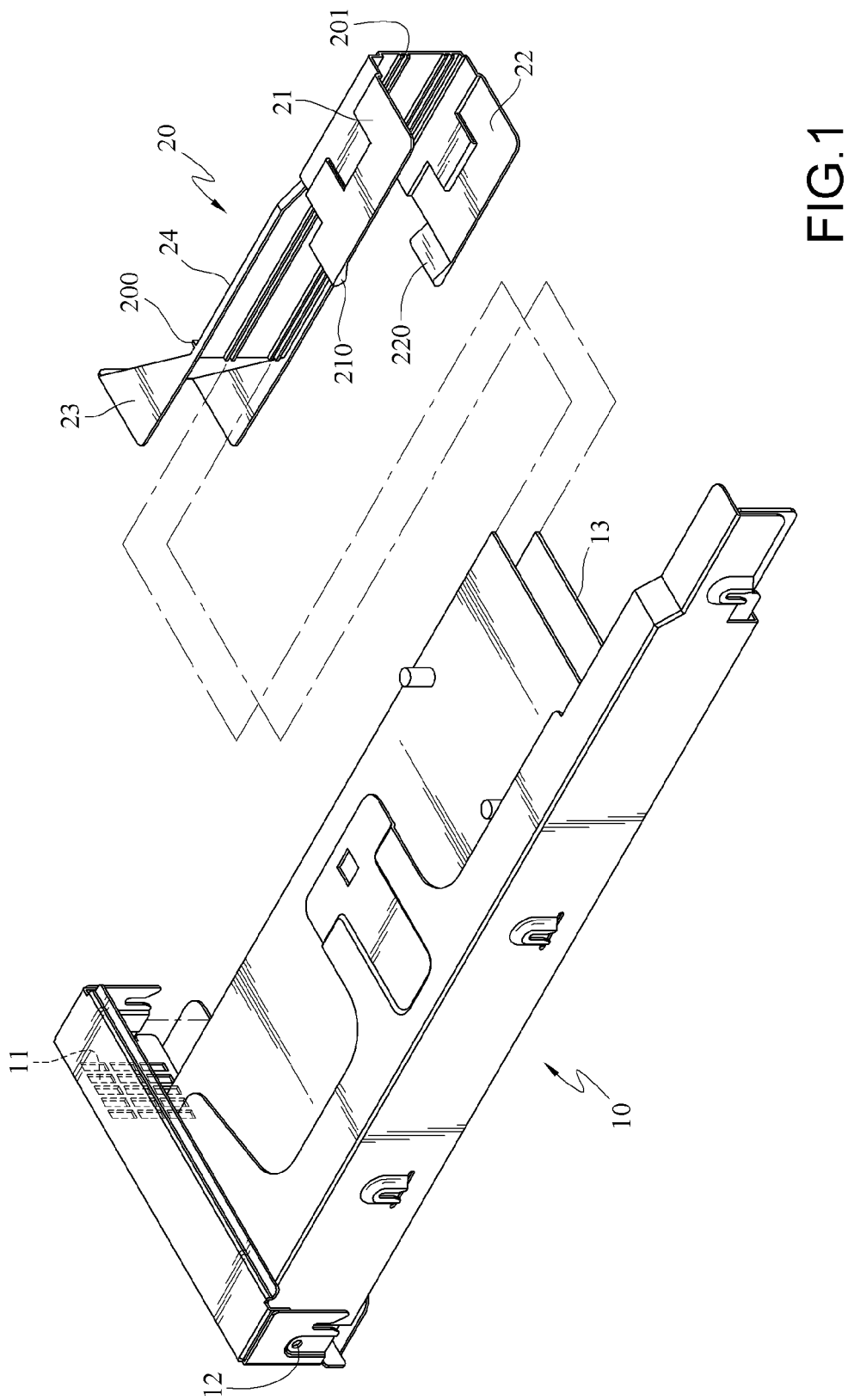
FIG. 1 is an exploded perspective view of a card fixing structure of the present invention.
Figure 2:
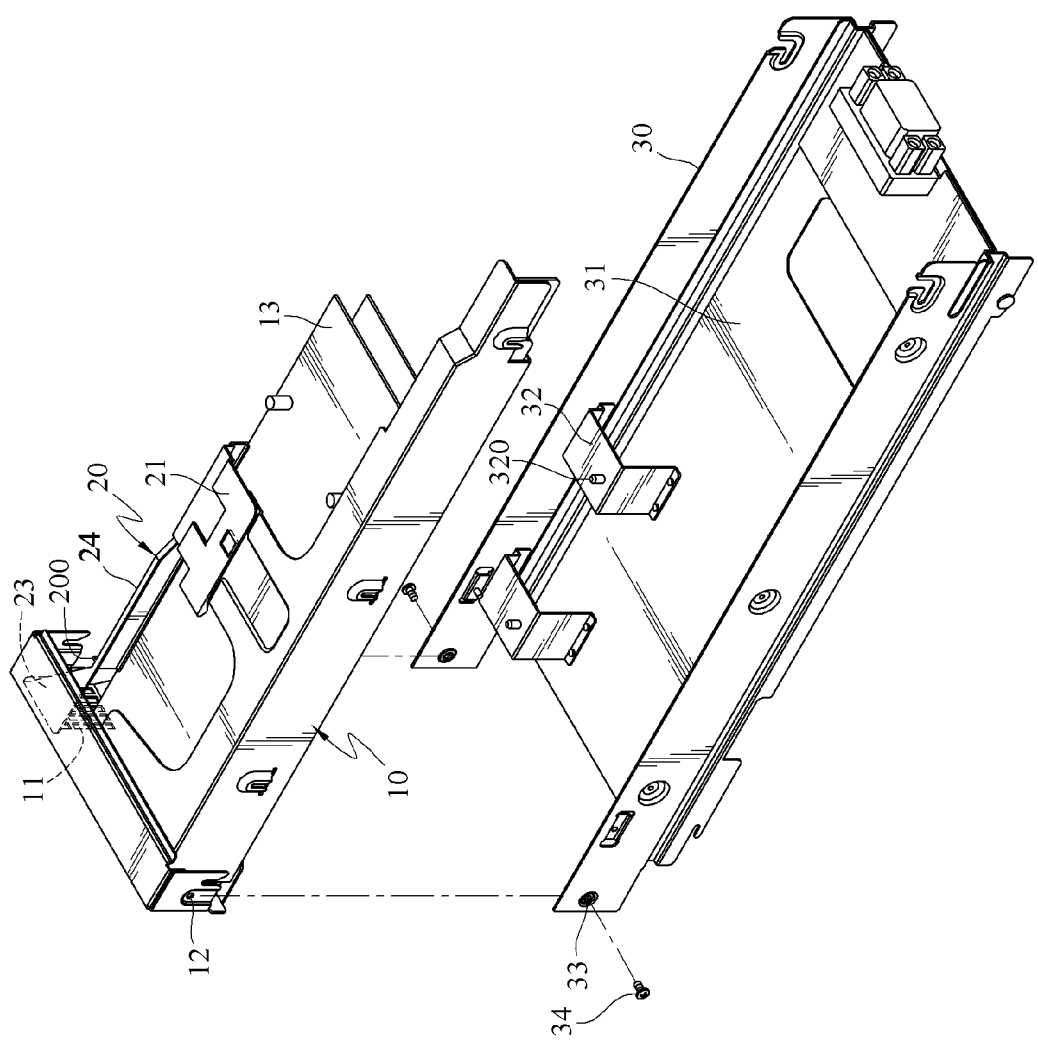
FIG. 2 is another exploded perspective view of the card fixing structure of the present invention.

Referring to FIGS. 1 and 2 together, a card fixing structure of the present invention is shown. The card fixing structure includes a card holder 10, an air deflector 20, and a base 30.

The card holder 10 is used for disposing at least one card 13 and has an air outlet 11 at its one end, and a screw hole 12 respectively on its two sides and adjacent to the air outlet 11.

Figure 3:
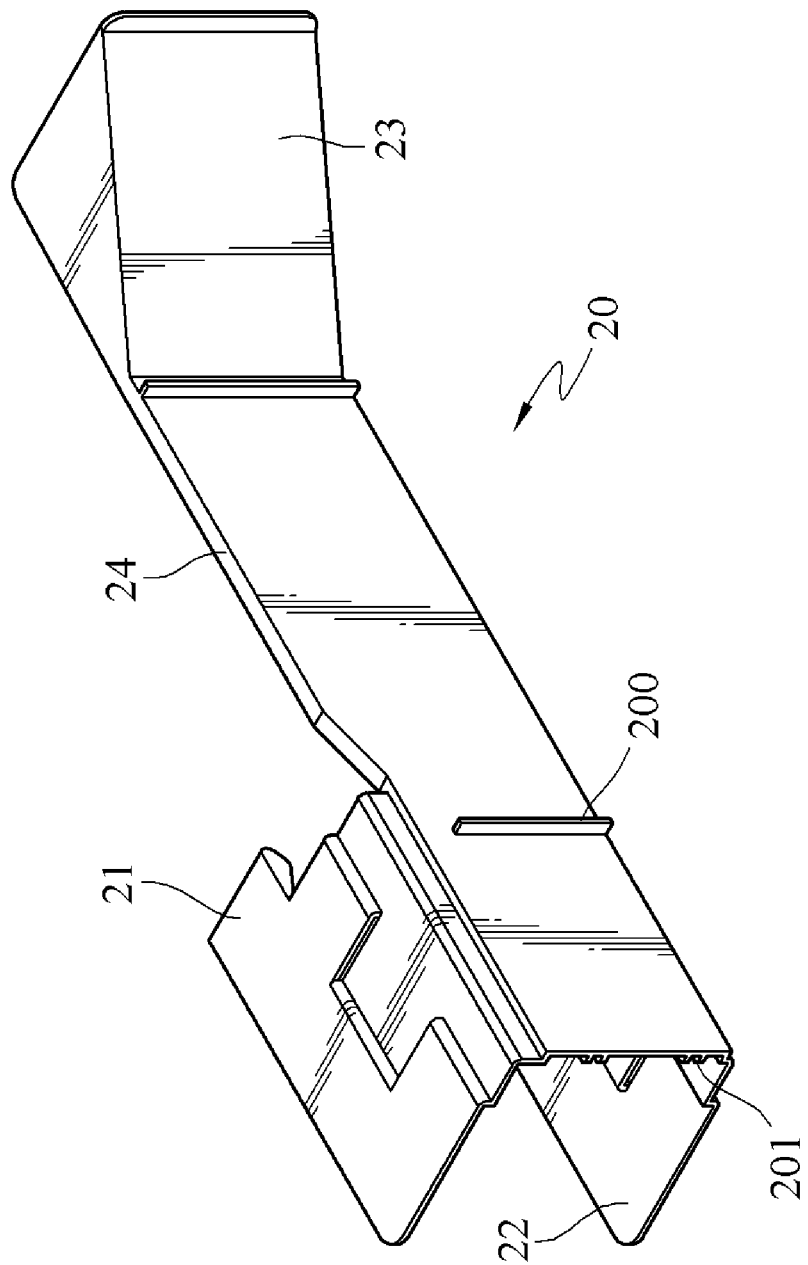
FIG. 3 is a perspective view of an air deflector of the present invention.

FIG. 3 is a perspective view of an appearance of an air deflector of the present invention. The air deflector 20 is clamped on one side of the card holder 10 and has a clamp portion 24. The clamp portion 24 has an upper clip 21 and a lower clip 22. The upper clip 21 has an upper protrusion 210 and the lower clip 22 has a lower protrusion 220. The upper protrusion 210 and the lower protrusion 220 respectively catch an upper edge and a lower edge of the card holder 10, so as to position the air deflector 20 at the card holder 10. The clamp portion 24 has at least one positioning rib 200 on its one side. In this embodiment, the number of the positioning rib 200 is two, and the positioning ribs 200 are disposed separately on one side of the air deflector 20. The clamp portion 24 has at least one guide rail 201 at its other side and between the upper clip 21 and the lower clip 22. The guide rail 201 catches a free end of the card 13, so as to securely fix the card 13 in the card holder 10. The air deflector 20 has a guide portion 23 at its other end and at a position position opposite to the air outlet 11, so as to guide the air to flow in a specific direction and go out through the air outlet 11.

The base 30 has an accommodation slot 31. The accommodation slot 31 has at least one urging portion 32 on its inner side. In this embodiment, two urging portions 32 are disposed separately on the inner side of the accommodation slot 31. The urging portions 32 respectively have a joining column 320 at its top end. The base 30 has a perforation 33 respectively on its two sides at a position opposite to the two screw holes 12 of the card holder 10.

Figure 4:
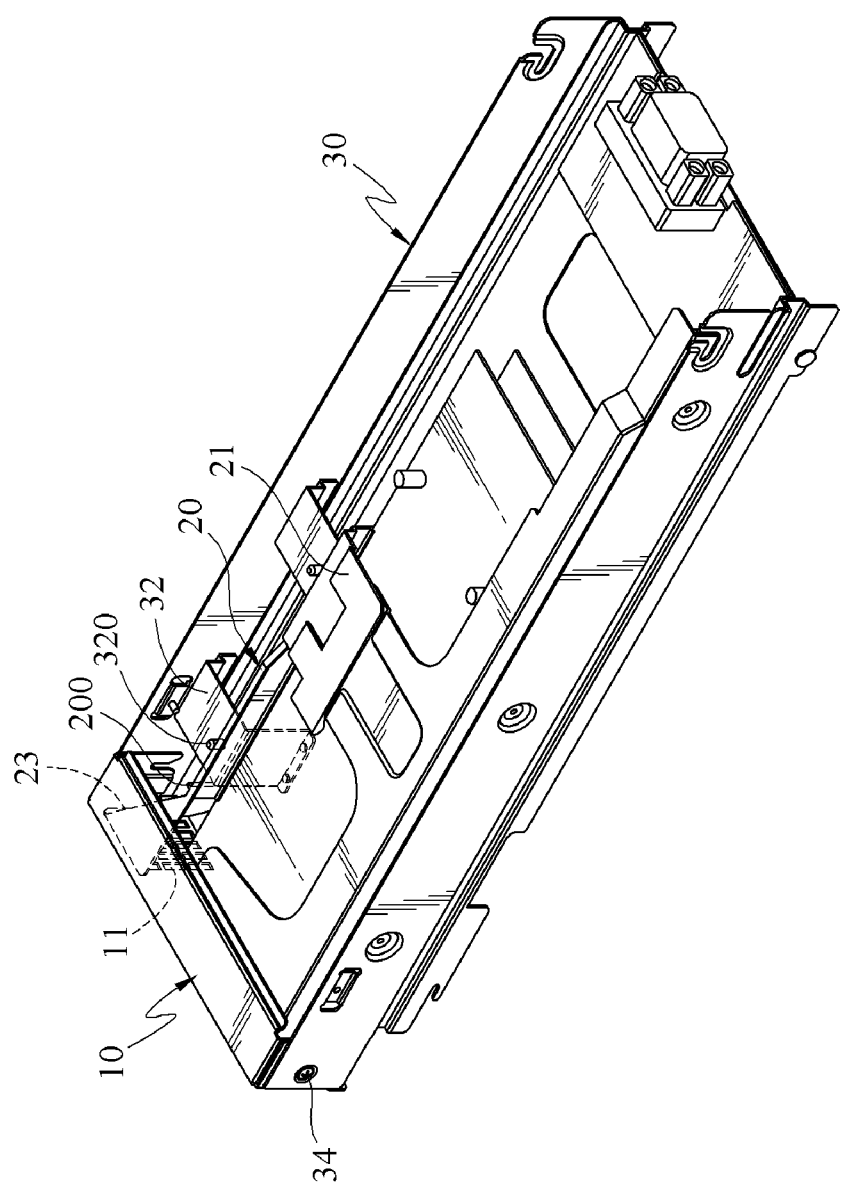
FIG. 4 is a perspective view of the card fixing structure of the present invention.

FIG. 4 is a perspective view of the card fixing structure of the present invention after being assembled. In actual assembly, a plurality of cards 13 is disposed in the card holder 10, and the air deflector 20 is clamped on one side of the card holder 10. The free end of the card 13 catches the guide rail 201, so as to securely fix the card 13 in the card holder 10. The card holder 10 with the air deflector 20 clamped thereon is placed into the accommodation slot 31 from thereabove. The side, on which the positioning rib 200 is disposed, of the air deflector 20 urges against the urging portion 32, and the urging portions 32 catches the positioning ribs 200, so as to position the card holder 10 in the accommodation slot 31. Thus, the card holder 10 and the air deflector 20 will not be easily separated through the urging relationship. A plurality of screws 34 passes through the perforations 33 and is fastened in the screw holes 12, and thus the card holder 10 is securely fixed in and combined with the base 30. Further, an upper cover is disposed above the base 30 and catches the joining columns 320, and thus the upper cover is fixed on the base 30. The combination of the upper cover and the base 30 is not the key point of the present invention and will not be described herein.

The above structure may be disposed in a casing of a server having a heatsink fan. The cool air blown by the heatsink fan is guided by the air deflector 20 to pass by the card 13, and then guided by the guide portion 23 to go out of the server through the air outlet 11.

According to the above structure, the air deflector 20 may guide the flow direction of the cool air. In addition, the air deflector 20 is clamped on one side of the card holder 10 and catches the card 13, so as to securely fix the card 13 in the card holder 10, thereby reducing the number of the screws or other fixing members through this combination manner, and reducing the manpower consumption to cut down the expenditure.

Further, the air deflector 20 urges against the urging portion 32, such that the card holder 10 is positioned in the base 30, and meanwhile, the air deflector 20 and the card holder 10 will not be easily separated through this urging relationship. The air deflector 20, the card holder 10, and the base 30 are easy to be assembled or disassembled due to the combination relationship therebetween. When the card 13 needs replacement or installation, the combination manner enables an easier replacement or expansion of the card 13.

What is claimed is:

1. A card fixing structure, comprising:
    a card holder, for disposing at least one card and having an air outlet on its one side; and
    an air deflector, having a clamp portion at its one end and a guide portion on its other side adjacent to the air outlet, wherein the clamp portion is clamped on one side of the card holder and catches a card.

2. The card fixing structure according to claim 1, further comprising a base, wherein the base has an accommodation slot urging against the air deflector of the card holder, so as to position the card holder in the base.

3. The card fixing structure according to claim 2, wherein the base further has perforations where screws are disposed on its two sides, the card holder has a screw hole respectively on its two sides adjacent to the air outlet, and the screws pass through the perforations and are fastened in the screw holes, so as to combine the card holder and the base.

4. The card fixing structure according to claim 2, wherein the accommodation slot has at least one urging portion on its inner side, when the card holder is disposed in the accommodation slot, the urging portion(s) urge(s) against the air deflector of the card holder, so as to position the card holder in the base.

5. The card fixing structure according to claim 4, wherein the clamp portion has at least one positioning rib on its one side, and the positioning rib(s) catch(es) a lateral edge of the urging portion, such that the card holder is securely positioned in the accommodation slot.

6. The card fixing structure according to claim 4, wherein a number of the urging portion is two, and the urging portions are arranged on a same inner side of the accommodation slot.

7. The card fixing structure according to claim 4, wherein the urging portion has a joining column at its top end.

8. The card fixing structure according to claim 1, wherein the clamp portion has an upper clip and a lower clip parallel to the upper clip, and the upper clip and lower clip are respectively connected to the card holder, so as to clamp the air deflector at the card holder.

9. The card fixing structure according to claim 8, wherein the upper clip has an upper protrusion, the lower clip has a lower protrusion, and the upper protrusion and the lower protrusion catch an upper edge and a lower edge of the card holder.

10. The card fixing structure according to claim 8, wherein the clamp portion has at least one guide rail at its other side and between the upper clip and the lower clip, so as to catch the card.

* * * * *